United States Patent

[11] 3,573,789

[72] Inventors John V. Sharp
West Hurley;
Donald R. Thompson, Woodstock, N.Y.

[21] Appl. No. 783,685
[22] Filed Dec. 13, 1968
[45] Patented Apr. 6, 1971
[73] Assignee International Business Machines Corporation
Armonk, N.Y.

[54] METHOD AND APPARATUS FOR INCREASING IMAGE RESOLUTION
10 Claims, 11 Drawing Figs.

[52] U.S. Cl. .......... 340/324, 178/6, 340/146.3
[51] Int. Cl. .......... G06f 3/14
[50] Field of Search .......... 340/347, 324, 146.3, (Inquired); 178/6 (BWR), (Inquired)

[56] References Cited
UNITED STATES PATENTS
2,921,124 1/1960 Graham .......... 178/6
3,470,325 9/1969 Frohbach .......... 178/6

*Primary Examiner*—John W. Caldwell
*Assistant Examiner*—Marshall M. Curtis
*Attorneys*—Hanifin and Clark and Edward M. Suden

ABSTRACT: An apparatus and the method embodied therein for increasing the resolution of a data image received and stored in binary form. The method interrogates each data bit with respect to two or more data bits which surround the data bit being interrogated and expands the interrogated data bit into a plurality of new data bits. The apparatus comprises a first storage means, an expander, and a second storage means for storing the newly generated information.

INVENTORS
JOHN V. SHARP
DONALD R. THOMPSON

BY Edward M. Sudey
AGENT

METHOD AND APPARATUS FOR INCREASING IMAGE RESOLUTION

BACKGROUND OF THE INVENTION

1. Field of the Invention

The field of the invention relates to an apparatus and the method embodied therein for increasing the resolution of a received data image in a communication system. More specifically, the invention relates to a digital-to-digital converter for expanding the image resolution of a received data image, to be displayed in a communication system.

2. Prior Art

In the past, in communication systems in which a data image was transmitted from a transmitting station to a receiving station, the resolution of the final image to be displayed was dependent upon the generation of the data image at the transmitting station. Thus, if the data image generated at the transmitting station was limited to a resolution of *m* samples per square inch, then the data image to be displayed at the receiving station was also limited to *m* samples per square inch regardless of the capability of the display mechanism at the receiving station. The displaying mechanism may be of the permanent record type or of a visual type; that is, a cathode ray display.

It is, therefore, an object of the present invention to provide a new apparatus which will allow the resolution of an image to be displayed to be dependent rather on the displaying apparatus than on the encoder which generates the original data image.

Another object of the invention is a novel method for increasing the resolution of a data image by interrogating each bit position within the data image with respect to its surrounding data bits, such that each data bit within the original data image gives rise to a plurality of data bits within the image to be displayed.

SUMMARY OF THE INVENTION

The invention herein described was made in the course of or under a contract with the Department of the Army. The invention relates to an apparatus and the method embodied therein for expanding the resolution of a data image in a communication system. The method employed expands each data bit which was assigned a physical area in the image to be displayed into a plurality of data bits which are still associated with the same physical area of the image to be displayed. The expansion of the data bits is obtained by comparing each data bit with its surrounding eight data bits. If the original data bit signified that the area was to be displayed then the area will still be displayed. However, where the data bit indicates that the physical area was not to be displayed then one or more of the newly generated plurality of data bits will be displayed as a function of the surrounding eight data bits within the original data image.

The apparatus, a resolution expander, comprises a storage register for storing the data bit to be interrogated and its associated eight surrounding data bits. The outputs of the storage register are entered into an expander which interrogates the data bit position and generates a plurality of output signals as a function of the value of the data bit position and the values of the associated eight surrounding data bit positions of the original data image. Storage means are made available for storing the newly generated plurality of data bits for either displaying that area of the physical image associated with the data bit being interrogated in accordance with the newly generated plurality of data bits restoring to form a new data image having a higher resolution than the original data image.

The advantage of such an apparatus is that it allows an image to be displayed having a high resolution, that is, more data bits per square inch, than the resolution that was generated at the transmitting station. By employing such an apparatus, the resolution characteristic of the image displayed is not solely dependent upon the resolution capability of the image encoder at the transmitting station, but rather becomes a function of the displaying capability at the receiving station.

Another advantage of the invention is that it allows less data bits to be transmitted by a transmitting station to obtain approximately the same resolution at the receiving station that was available in the prior art.

BRIEF DESCRIPTION OF THE DRAWINGS

The foregoing and other objects, features and advantages of the invention will be apparent from the following more particular description of the preferred embodiment of the invention, as illustrated in the accompanying drawings.

In the drawings.

DETAILED DESCRIPTION AND OPERATION OF THE PREFERRED EMBODIMENT

The invention in its broadest sense deals with increasing the resolution of a data image by increasing the amount of data within the original data image by some factor *K*, that is, each data bit is expanded into *K* data bits. It should further be realized that any number of data bits may be expanded at the same time, the number expanded is dependent upon the amount of hardware and cost that one is willing to expend in building the resolution expander. For the sake of clarity in describing the basic invention, the description of the preferred embodiment of the invention will be made with reference to expanding each data bit into four data bits and expanding only one data bit at a time.

Figure 1:
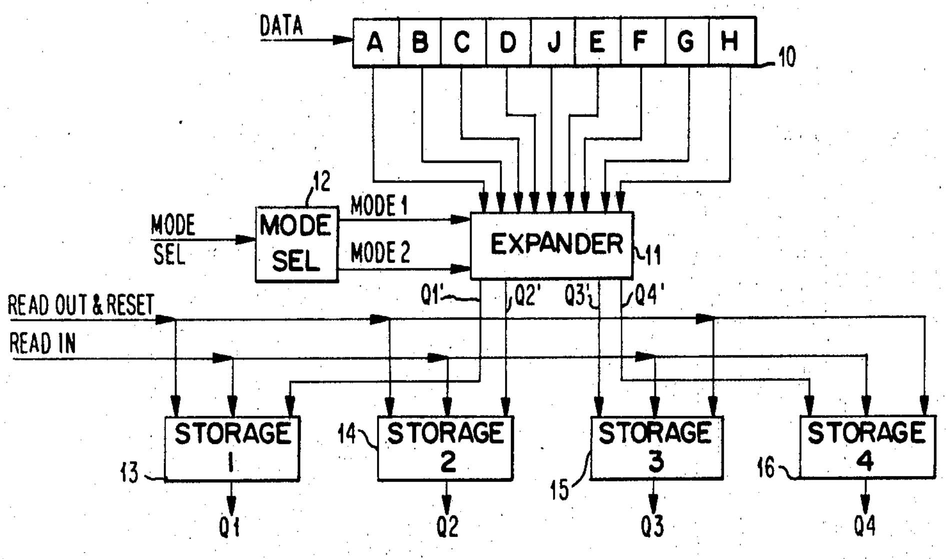
FIG. 1 shows the preferred embodiment of the resolution expander apparatus.

FIG. 1 shows a resolution expander which embodies the invention. The resolution expander is comprised of a nine-position shift register 10 which stores the data bit to be expanded and its associated eight surrounding data bits from the data image. The output of shift registers 10 is inputted to expander 11. Expander 11 also has as its inputs two mode selection signals from mode selection means 12. Mode selection means 12 may be a manual switch or a remotely controlled selection circuitry. Expander 11 has four output lines, Q1′, Q2′, Q3′ and Q4′. The output signals on lines Q1′—Q4′ are stored in storage units 13, 14, 15 and 16. Control signals to read in the output of expander 11 into storage units 13, 14, 15 and 16 is provided. A readout and reset signal to read out the value stored in storage units 13, 14, 15 and 16 is also provided. The storage units 13, 14, 15 and 16 may consist of flip-flops with gated inputs and outputs which are well known in the art.

The resolution expander as shown in FIG. 1 may actually operate in three different modes of operation. Where neither mode I nor mode II is selected, the resolution expander will be for all intents and purposes out of the system, and the image produced will be the image that would have been displayed by the prior-art devices. The mode I type of operation will produce four data bits for each original data bit in the data image. The area associated with the original data bit will be partitioned into four square segments as shown in block J of FIG. 2. The four output signals, Q1, Q2, Q3 and Q4, of the resolution expander correspond to sections, 1, 2, 3 and 4 of block J. When mode II type of operation of expander 11 of the resolution expander is selected, each data bit of the original data image will be expanded to four data bits and the area corresponding to the original data bit will be partitioned into four triangular areas as shown by box J of FIG. 3. The output lines Q1, Q2, Q3 and Q4, of resolution expander correspond to the areas 1, 2, 3 and 4 of box J as shown in FIG. 3.

The method embodied within the resolution expander is to interrogate each data bit within the data image one at a time. This is done by either reading the data image column by column or row by row. In this description, the data will be read column by column. It should be realized that it is necessary not only to read out the data bit to be interrogated, but also the eight surrounding associated data bits. In order to perform this function, three adjacent data bits are read into the shift register as a block of data. The data bit in position J of shift register 10 will be the data bit under interrogation. It can now be realized that after a given bit position has been expanded, for example, position N, M, which was in position J of shift register 10, that the shifting of the next three bits of information into shift register 10 will move the data that was in position B to position J such that the next position that will be interrogated will be position M+1, N. It can, therefore, be seen that by progressive shifting of three bits into shift register 10 that all data bits within a column N may be expanded, and then by addressing the next column all the data bits within column N+1 will be expanded and so on, until all data image have been expanded.

In a mode I type of operation a data bit in position J of shift register 10 will be expanded into 4 data bits which will appear on output lines Q1′, Q2′, Q3′ and Q4′ of expander 11. The physical area associated with the data bits stored in position J of shift register 10 is partitioned into four square areas 1, 2, 3 and 4 which will be displayed in accordance with the signal on output lines Q1, Q2, Q3 and Q4 of the storage units 13, 14, 15 and 16 respectively.

All four areas of box J will be displayed when the data bit in position J of shift register 10 was to be displayed which causes a signal to appear on output lines Q1′, Q2′, Q3′ and Q4′ of expander 11. If the date bit in position J of shift register 10 was such as to not have been displayed, then signals will appear on lines Q1′, Q2′, Q3′ and Q4′ of expander 11 which will display from zero to four positions of areas 1, 2, 3 and 4 as a function of the values of the eight surrounding data positions A—H.

Figure 2:
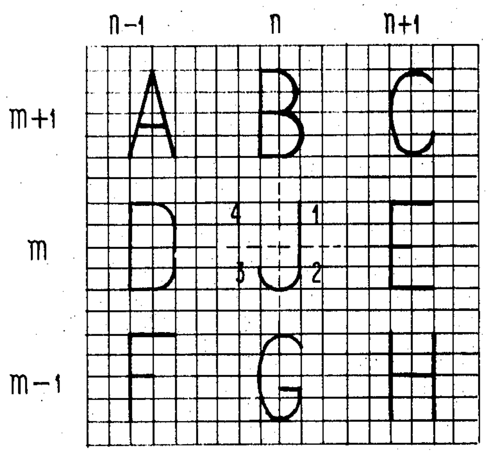
FIG. 2 shows a data bit position diagram and a mode 1 type of expansion of the resolution expander in FIG. 1.
Figure 3:
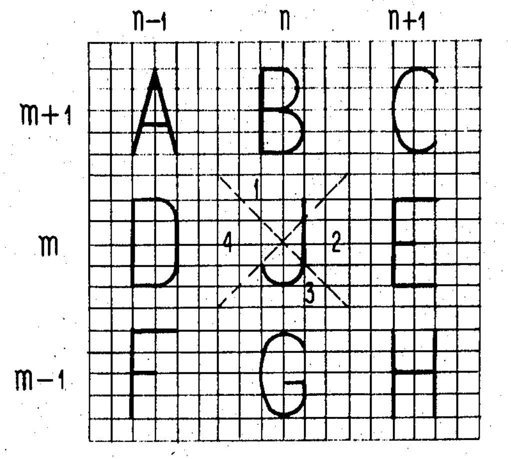
FIG. 3 shows a data bit position and a mode II type of expansion of the resolution expander shown in FIG. 1.

With reference to FIG. 2, areas 1, 2, 3 or 4 will be displayed if an interrogated data bit position is bounded on two sides by surrounding decision bit positions which are to be displayed. This is to say that if areas B and E were to be displayed and area J was not to be displayed then section 1 of area J will be displayed. In similar manner, if areas E and G were to be displayed, then area 2 will be displayed; if areas G and D were to be displayed, then area 3 will be displayed; if areas D and B were to be displayed, then area 4 will be displayed.

Further, areas 1, 2, 3 or 4 not previously selected to be displayed will be displayed if the area is bounded on one side by one of areas 1, 2, 3 or 4 already selected to be displayed and on a second side by one of the surrounding decision bit positions B, E, D or G which is to be displayed; if and only if decision bit A, C, H or F is also to be displayed and bounds that surrounding decision bit positions B, E, D or F bounding the second side of the area to be displayed. Therefore, if B, E and H are to be displayed then areas 1 and 2 will be displayed, if B, E and A are to be displayed then areas 1 and 4 will be displayed; thus, E, G and F yields 2 and 3; E, G and C yields 1 and 2; G, D and A yield 3 and 4; G and H yield 3 and 2; D, B and F yield 3 and 4; D, B and C yield 4 and 1.

When mode II type of operation is selected for expander 11 of the resolution expander, the area associated with the data bit position being expanded is partitioned into four equal triangular areas shown in box J of FIG. 3. Selected areas 1, 2, 3 or 4 will be displayed for each area 1, 2, 3 or 4 that is bounded on one side by a surrounding decision bit position which is to be displayed and on a second side by one of the areas 1, 2, 3 or 4 which is also bounded by one of the surrounding decision bit position which is to be displayed. With reference to FIG. 3, is decision bit positions B and E are to be displayed and position J was not to be displayed, then areas 1 and 2 will be displayed. In similar fashion, if decision bit positions E and G are to be displayed then areas 2 and 3 of box J will be displayed; if decision bit position D and G were to be displayed, then areas 3 and 4 of box J will be displayed; and finally if decision bit position D and B are to be displayed, then areas 1 and 4 of box J will be displayed.

Figure 4:
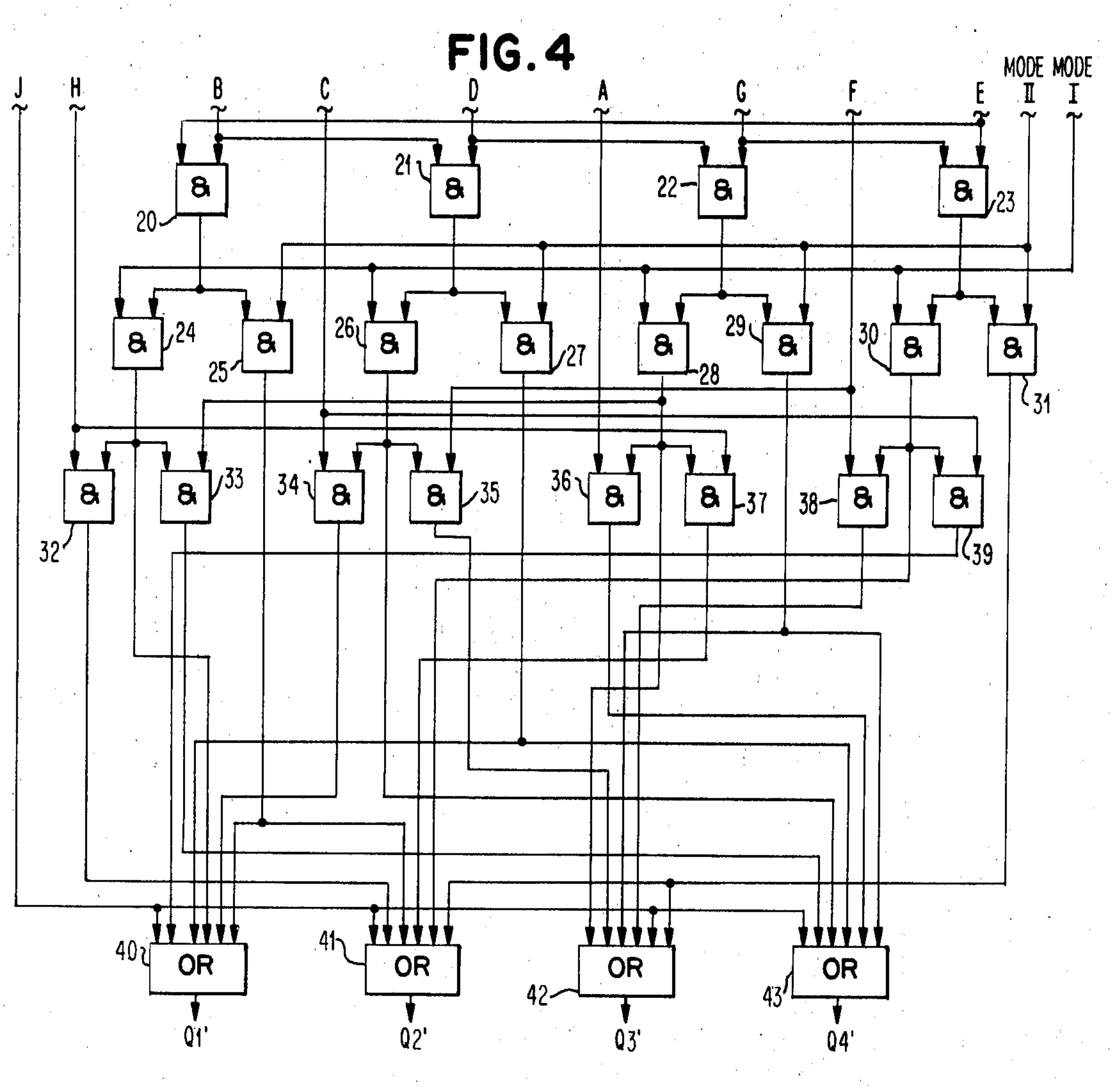
FIG. 4 is a logic diagram of the expander of the resolution expander shown in FIG. 1.

FIG. 4 shows the logic implementation of expander 11 which will provide proper outputs on lines Q1′, Q2′, Q3′ and Q4′ for all three modes of operation of the resolution expander. The expander 11 is a digital-to-digital data expander and is comprised of well-known AND and OR circuits. When neither mode I or mode II has been selected the value of shift register position J will control the output of OR circuits 40, 41, 42 and 43 directly. It should be noted that whenever J is equal to a 1, that is, that the area J should be displayed, that the output of OR circuits 40, 41, 42 and 43 will always be a 1, regardless of the mode of operation. However, if the value of J is equal to zero, then the output of OR circuits 40, 41, 42 and 43 will always be equal to a zero only when neither mode I or mode II has been selected. However, when mode I or mode II has been selected and the value of area J in shift register 10 is equal to a zero, then the output of OR circuits 40, 41, 42 and 43 will be determined by the logic of AND circuits 20 through 39.

In a mode II type of operation, AND circuits 20, 21, 22, 23, 25, 27, 29, 31, and OR circuits 40, 41, 42, 43 are the decision making elements of expander 11. In a mode I type of operation, AND circuits 20, 21, 22, 23, 24, 26, 28, 30. 32 through 39 and OR circuits 40 through 43 are the decision making elements of expander 11. The logic statements embodied within the expander 11 are those to perform the function previously described under a mode I or mode II type of operation. It is felt that it is well within the skill of the art to determine which of the output lines Q1′ through Q4′ of expander 11 will be activated under any given set of input signals A through J and therefore, it will not be described in detail.

Figure 5:
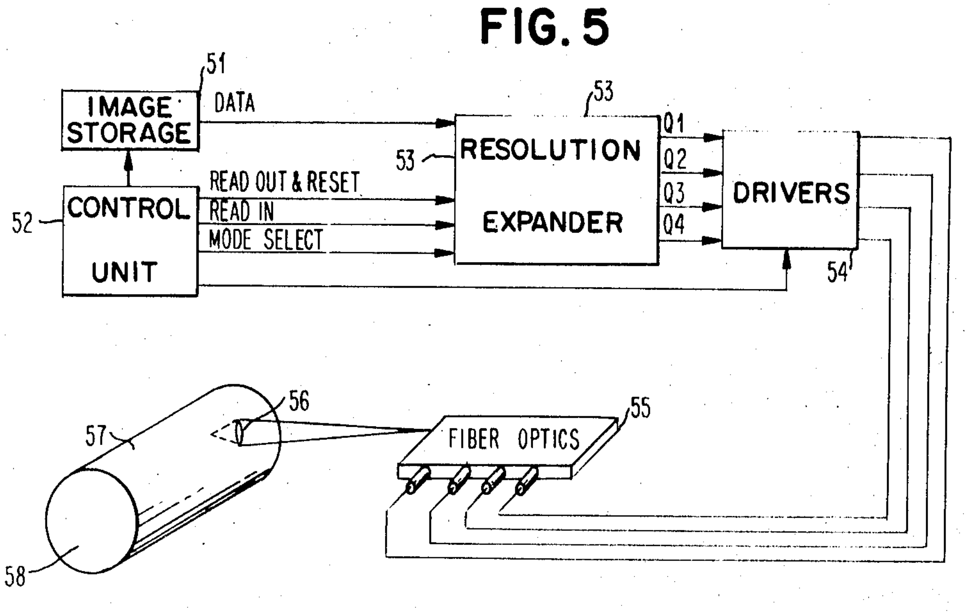
FIG. 5 shows a display system employing the resolution expander as shown in FIG. 1.

FIG. 5 shows a system employing the resolution expander 53 which is the resolution expander as shown in FIG. 1. The system is comprised of an image storage 51, a control unit 52 which controls the operation of the component parts of the system, the resolution expander 53, driver units 54 for driving the fiber optics unit 55, a lens system 56 for focusing the output of the fiber optic system 55 on a film 57 attached to a rotating drum 58. In this system as each data bit of the data image is expanded, the resulting four data bits appear on output lines Q1, Q2, Q3, and Q4 of the resolution expander. These signals activate the proper drivers of driver circuitry 54 to drive the proper fiber optics 55, the fiber optics effectively partition the area into four sections and these four areas are properly exposed by the output of the fiber optics 55 focused on film 57 by lens 56. The system will print a column at a time as drum 58 rotates and then the fiber optics system will be indexed such that the next column may be properly exposed. In the prior art, the area that is exposed by the fiber optics 55 would have been fully exposed if the data bit representing that area of the film was designated to be displayed. In this system, the same area has been partitioned into four areas by means of the fiber optics 55 and lens system 56. The mode of operation which is used in the expander 11 of the resolution expander 53 is determined upon the method in which the fiber optics partitioned the area to be printed, that is, whether into four square areas or into four triangular areas.

Figure 6:
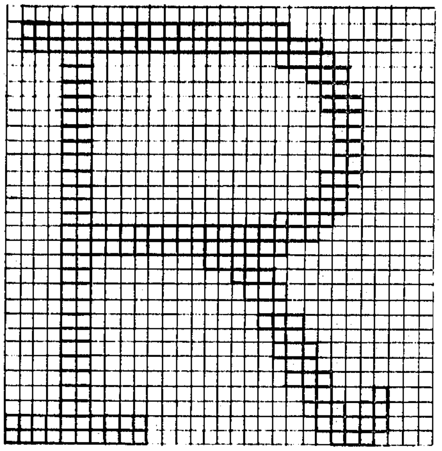
FIG 6 shows a character as would be displayed by the prior-art apparatus.
Figure 7:
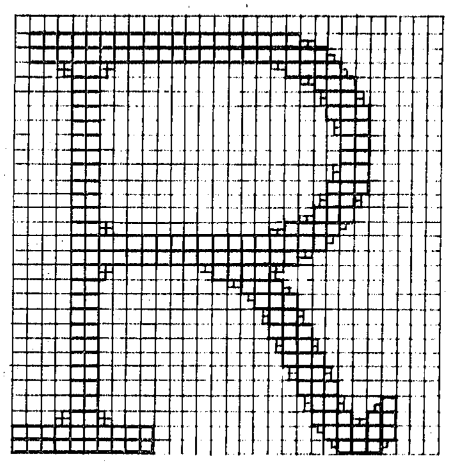
FIG. 7 displays a character as would be generated by the system shown in FIG. 5 employing a mode I type of operation of the resolution expander.
Figure 8:
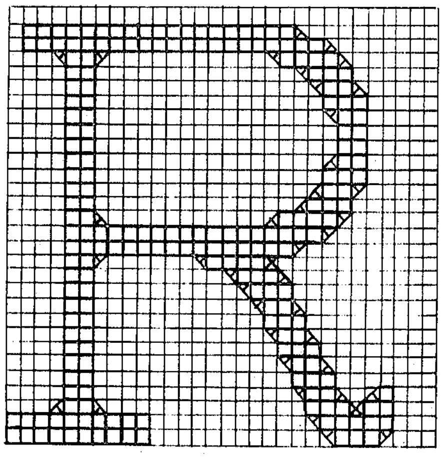
FIG. 8 displays the character as would be generated by the system as shown in FIG. 5 employing a mode II type of operation of the resolution expander.

For a given data image stored in image storage 51, the system shown in 55 will produce the character R as shown in FIG. 6 if neither mode I nor mode II type of operation has been selected. This would be equivalent to a 1-to-1 correspondence between the data image and the physical image to be printed. When the resolution expander 53 is operating in a mode I type of operation, then the same data that would have caused the character R to appear as in FIG. 6 will cause the character R to appear as shown in FIG. 7. As can be seen, the resolution has been increased. In a mode II type of operation, the data image stored in image storage 51 will give rise to the character R as displayed in FIG. 8. The decision as to whether to use mode I or mode II type of operation is, as previously stated, dependent upon how the fiber optics divided up the specific area to be displayed.

Figure 9:
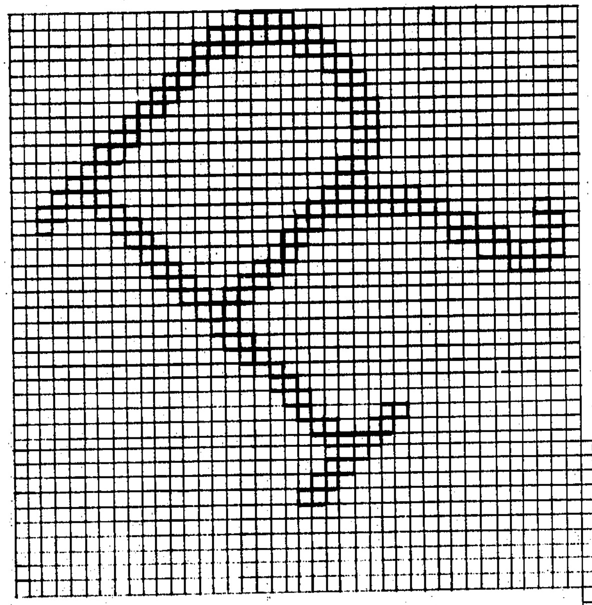
FIG. 9 displays a character as would be generated by the prior-art systems.
Figure 10:
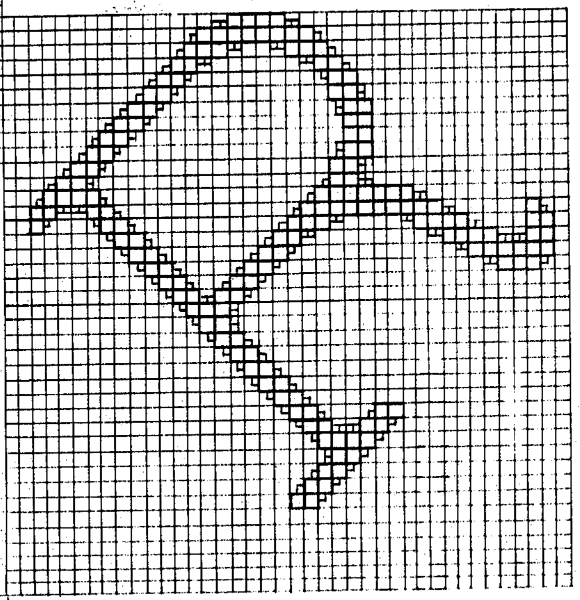
FIG. 10 displays a character as would be generated by the system shown in FIG. 5 employing a mode I type of operation of the resolution expander.
Figure 11:
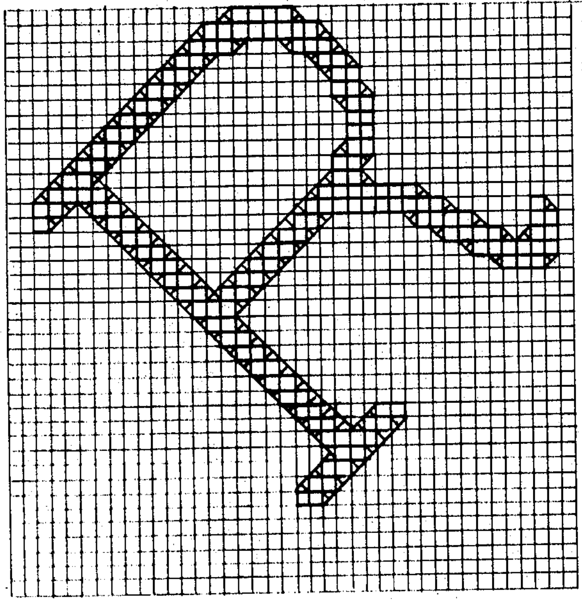
FIG. 11 shows a character as would be generated by the system shown in FIG. 5 employing a mode II type of operation of the resolution expander.

Often a data image is not horizontally positioned and exist at some angle. FIGS. 9, 10 and 11 are used to compare the resultant printed image of the prior art, mode I and mode II type operation of the present invention. FIG. 9 shows the data image as would be displayed by the prior art and by the system shown in FIG. 5 if neither a mode I nor mode II type of operation had been selected. Where a mode I type of operation has been selected, the character R as shown in FIG. 10 will be displayed. Further, if a mode II type of operation was selected, the character R as shown in FIG. 11 will be displayed. It should be noted that the selection of a mode I or mode II type of operation is strictly an operator's choice depending upon the fiber optics for the partitioning means for printing or displaying is at this command.

In essence, the invention has expanded a data image that consisted of N×M data points into a data image having K (M×N) data points where K is the number of data bits created for each data bit in the original data image. It can be clearly seen that by the use of simple hardware, the resolution of a given image may be greatly increased. It should further be noted that a data image may comprise an entire page of information and need not be constrained to a single character.

In an actual facsimile system the number of data bits for any given character is much greater than that shown in FIG. 6 through 10 and it should therefore be realized that the increase in resolution that will result from the use of the resolution expander will be even more significant than that shown in FIGS. 7, 8, 10 and 11.

While the invention has been described with respect to expanding a single data bit of the data image at a given time, it must be realized that it is well within the state of the art to expand anywhere from one to all of the data bits of the data image at a single instant of time or in any such sequence or manner that the designer may desire. Further, the invention has been shown to generate four data bits for each original data bit within the date image, and it is clearly within the skill of the art to extend the method described therein to expand each data bit within the data image into more than or less than four data bits according to the resolution of the displaying apparatus.

We claim:

1. A method, for increasing the resolution of a system for producing images, said images being stored as a data image comprising a matrix of first binary bits of first and second binary values, each first binary bit representing an area of the physical image to be displayed, comprising the steps of:

expanding each said first binary bits of a first value into $k$ second binary bits of said first value and each said first binary bits of a second value into $k$ third binary bits, the value of each of said $k$ third binary bits being dependent on the value of said first binary bits adjacent each of said binary bits of a second value;

partitioning each of said areas of said physical image represented by each first binary bits into $k$ sections; and displaying each of said $k$ sections of said areas of said physical image as a function of said $k$ second and $k$ third binary bits whereby the number of binary bits of said data image is increased by factor $k$.

2. A method for increasing resolution as set forth in claim 1 wherein the step of partitioning forms four sections of equal area.

3. A method for increasing resolution as set forth in claim 2 wherein the step of partitioning forms four square sections.

4. A method for increasing resolution as set forth in claim 2 wherein the step of partitioning forms four triangular sections.

5. A method for increasing resolution as set forth in claim 3 wherein the step of expanding each said first binary bit of a second value further comprises the steps of:

storing a first binary bit associated with location position $P(n,m)$;

storing first binary bits associated with decision position $P(n-1,b8l1)$, $P(n-1,m)$, $P(n-1,m+1)$, $P(n,m-1)$, $P(n,m+1$, $P(n+1,m-1)$, $P(n+1,m)$ and $P(n+1,m+1)$; and expanding said stored first binary bits associated with location position into said four third binary bits, the value of each of said four third binary bits being a function of the binary values of said stored positions.

6. A method for increasing the resolution as set forth in claim 5 wherein the step of expanding further comprises the steps of:

first assigning a first binary value to said four third binary bits which are bounded on two sides by first and second decision positions having a first binary value;

second assigning a first binary value to said four third binary bits which are bounded on one side by a first assigned four third binary bit and on a second side by either of said first or second decision position, if and only if said first or second decision position is further bounded by a third decision position having a first binary value which is not common to said first and second decision positions; and third assigning a second binary value to the remaining said four third binary bits of said first and second assigning.

7. A method for increasing the resolution as set forth in claim 4 wherein the step of second expanding further comprises the steps of:

storing a first binary bit associated with a location position $P(n, m)$;

storing first binary bits associated with decision positions $P(n-1, m)$, $P(n, m+1)$, $P(n+1, m)$ and $P(n, m-1)$; and expanding said stored first binary bits associated with the location positions into said four third binary bits, the value of each of said four third binary bits being a function of the binary values of said stored decision positions.

8. A method for increasing the resolution as set forth in claim 7 wherein the step of expanding further comprises the steps of:

first assigning a first binary value to said four third binary bits which are bounded on a first side by a decision position having a first binary value and bounded on a second side by another one of said four third binary bits which is also bounded on one side by a decision position having a first binary value; and said assigning a second binary value to the remaining of four third binary bits from said first assigning.

9. An apparatus, for increasing the resolution of a data image stored in an image display system, comprising:

a first storage means for storing a portion of said stored data image, said portion comprising first data bits and second data bits, said second data bits being the surrounding data bits of said first data bits within said data image;

an expanding means connected to said first storage means for expanding each said first data bits into $k$ third data bits, the value of each of said $k$ third data bits being a function of the value of said first data bit and the values of selected said second data bits; and second storage means connected to said expanding means for storing said $k$ third data bits, the output of said storage means making the values of said $k$ third data bit available to said image display system whereby the data image stored in said image display system has been increased by a factor $k$.

10. An apparatus as set forth in claim 9 wherein said first storage means stores only one of said first data bits and the associated eight surrounding second data bits; said expanding means expanding said first data bits into four third data bits, the value of said four third data bits being a function of the value of said first data bit, and the values of said surrounding eight second data bits.